US012622837B2

(12) United States Patent
Delazio et al.

(10) Patent No.: US 12,622,837 B2
(45) Date of Patent: May 12, 2026

(54) STAIR NAVIGATION ASSIST SYSTEM

(71) Applicant: UNIVERSITY OF PITTSBURGH—OF THE COMMONWEALTH SYSTEM OF HIGHER EDUCATION, Pittsburgh, PA (US)

(72) Inventors: Alexandra Delazio, Pittsburgh, PA (US); Alton E. James, III, Pittsburgh, PA (US); David M. Brienza, Allison Park, PA (US); Jonathan L Pearlman, Pittsburgh, PA (US); Paulina M. Villacreces, Pittsburgh, PA (US); MD Rayhan Afsar, Pittsburgh, PA (US); Todd Hargroder, San Antonio, TX (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 255 days.

(21) Appl. No.: 18/460,971

(22) Filed: Sep. 5, 2023

(65) Prior Publication Data

US 2024/0099924 A1 Mar. 28, 2024

Related U.S. Application Data

(60) Provisional application No. 63/374,947, filed on Sep. 8, 2022.

(51) Int. Cl.
*A61H 3/00* (2006.01)
*B66B 23/04* (2006.01)
(Continued)

(52) U.S. Cl.
CPC ............ *A61H 3/00* (2013.01); *E04F 11/1808* (2013.01); *E04F 11/1863* (2013.01);
(Continued)

(58) Field of Classification Search
None
See application file for complete search history.

(56) References Cited

U.S. PATENT DOCUMENTS 4,232,776 A * 11/1980 Dean ........................ B66B 23/26 198/791
7,552,812 B2 * 6/2009 Gonzalez ................ B66B 29/04 198/323
(Continued)

FOREIGN PATENT DOCUMENTS

WO 2012143741 A2 10/2012
WO 2014195227 A2 12/2014

OTHER PUBLICATIONS

RailBot: A Novel Assistive Device for Stair Climbing, Md Rayhan Afsar, Md Rejwanul Haque, Mason Dooley, Xiangrong Shen; Crossmark: Check for Updates; Author and Article Information J. Med. Devices. Mar. 2021, 15(1): 014505 (5 pages); Paper No. MED-20-1155 https://doi.org/10.1115/1.4049546; Published Online: Jan. 28, 2021.

*Primary Examiner* — Kavel Singh
(74) *Attorney, Agent, or Firm* — Philip E. Levy; Eckert Seamans Cherin & Mellott, LLC

(57) ABSTRACT

A system for assisting a user with navigating a set of stairs includes a pulley system positioned adjacent to the stairs, the pulley system including a first pulley, a second pulley, and an elongated member coupled to and looped around the first pulley and the second pulley. The system further includes a motor coupled to the first pulley, a sensing assembly operatively coupled to the pulley system, the sensing assembly being structured and configured to sense that a force is being applied to or that is about to be applied to the elongated member by the user, and a controller coupled to the motor and the sensing assembly. The controller is structured and
(Continued)

configured to, responsive to the sensing assembly sensing the force, turn the motor on to drive the first pulley.

18 Claims, 7 Drawing Sheets

(51) Int. Cl.
*B66B 25/00* (2006.01)
*E04F 11/18* (2006.01)
(52) U.S. Cl.
CPC .................. *A61H 2003/001* (2013.01); *A61H 2201/1215* (2013.01); *A61H 2201/149* (2013.01); *E04F 2011/1876* (2013.01)

(56) References Cited

U.S. PATENT DOCUMENTS

| | | | | |
|---|---|---|---|---|
| 7,954,620 | B2 * | 6/2011 | Winkelhake ............ | B66B 23/04<br>198/330 |
| 8,205,735 | B2 * | 6/2012 | Behan ................. | E04F 11/1802<br>198/323 |
| 10,173,864 | B2 * | 1/2019 | Hu .......................... | B66B 23/20 |
| 2021/0353495 | A1 | 11/2021 | Shen et al. | |

* cited by examiner

STAIR NAVIGATION ASSIST SYSTEM

CROSS REFERENCE TO RELATED APPLICATIONS

This application claims priority to U.S. Provisional Patent Application Ser. No. 63/374,947, filed Sep. 8, 2022, titled "STAIR NAVIGATION ASSIST SYSTEM", the disclosure of which is incorporated herein by reference.

FIELD OF THE INVENTION

The present invention pertains to systems for providing assistance to those in need with navigating a set of stairs, and, in particular, to a stair navigation assist system that includes a rope and pulley assembly that is automatically activated/deactivated, such as through tension applied to the rope. Particular implementations may also use low-friction pulleys that act as a variable clutch to allow a user to throttle the support while ascending/descending the stairs, and also as a safety mechanism.

BACKGROUND OF THE INVENTION

Navigating stairs is one of the most difficult and risky activities for older adults that have mobility or visual impairments due to loss of strength, balance, and/or visual acuity. Despite this fact, the only widely available stairway assist technology is stairlift technology, which includes a mechanical device for lifting people, typically those with disabilities, up and down stairs. Stairlifts, however, are costly, cumbersome, and are applicable for only a certain range of stairway configurations due to their size and lack of modularity. Stairlifts are also designed to passively transfer people up and down stairs, and do not allow individuals who are still able to remain active. Furthermore, in homes with only a single staircase, fire regulations and building codes often do not permit stairlifts to be installed because they can compromise escape routes during an emergency. In addition, current stairlifts only allow for automated movement up and down the stairs in a seated position. This level of assistance is often more than what is needed to safely and effectively navigate the stairs.

Moreover, when navigating stairs in an upright walking position, typical handrails do not allow for a continuous grip and support (rather, the user must grip and release their hold on the handrail to move up or down the stairs). Devices such as the StairSteady (https://stairsteady.net/) and Assistep (https://stair-assist.com/), which do permit continuous engagement, require walking up the steps using both hands on a bar positioned horizontal to the stairs, which ultimately encourages a kyphotic position and invokes a feeling of instability or fear of falling over the bar in front of the user.

SUMMARY OF THE INVENTION

In one embodiment, a system for assisting a user with navigating a set of stairs is provided. The system includes a pulley system positioned adjacent to the stairs, the pulley system including a first pulley, a second pulley, and an elongated member coupled to and looped around the first pulley and the second pulley. The system further includes a motor coupled to the first pulley, a sensing assembly operatively coupled to the pulley system, the sensing assembly being structured and configured to sense that a force is being applied to or that is about to be applied to the elongated member by the user, and a controller coupled to the motor and the sensing assembly. The controller is structured and configured to, responsive to the sensing assembly sensing the force, turn the motor on to drive the first pulley.

In another embodiment, a method for assisting a user with navigating a set of stairs is provided. The method includes providing a pulley system positioned adjacent to the stairs, the pulley system including a first pulley, a second pulley, and an elongated member coupled to and looped around the first pulley and the second pulley, sensing that a force is being applied to or that is about to be applied to the elongated member by the user, and responsive to sensing the force, turning the motor on to drive the first pulley.

DETAILED DESCRIPTION

Figure 1:
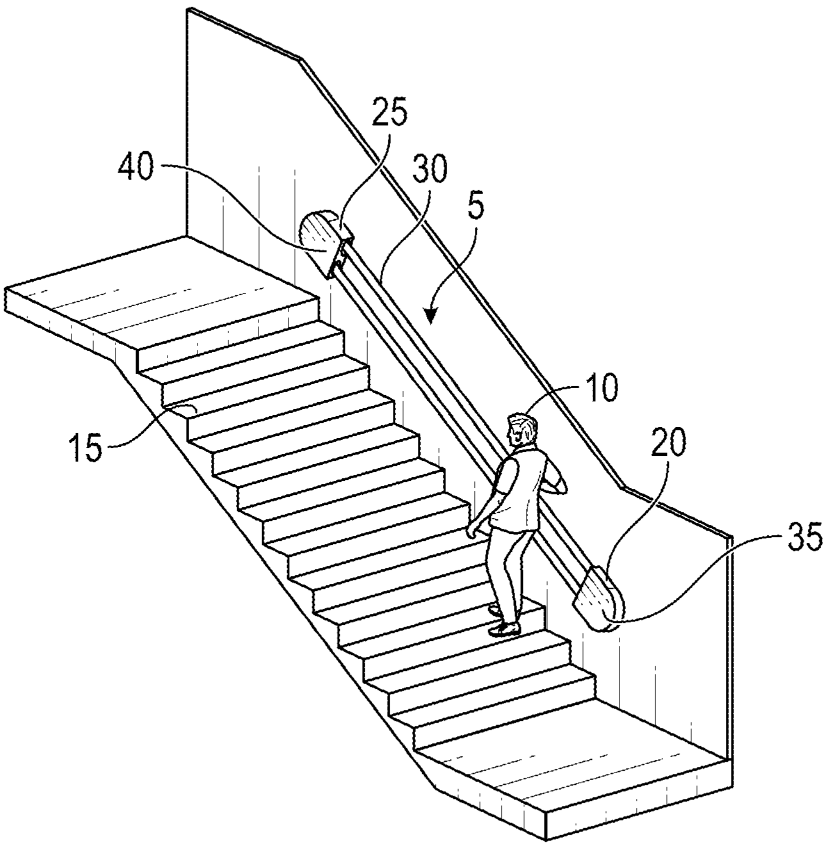
FIG. 1 is a schematic diagram of a stair navigation assist system according to an exemplary embodiment of the disclosed concept.

As used herein, the singular form of "a", "an", and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs.

As used herein, "directly coupled" means that two elements are directly in contact with each other.

As used herein, "fixedly coupled" or "fixed" means that two components are coupled so as to move as one while maintaining a constant orientation relative to each other.

As used herein, the word "unitary" means a component is created as a single piece or unit. That is, a component that includes pieces that are created separately and then coupled together as a unit is not a "unitary" component or body.

As used herein, the statement that two or more parts or components "engage" one another shall mean that the parts exert a force against one another either directly or through one or more intermediate parts or components.

As used herein, the term "number" shall mean one or an integer greater than one (i.e., a plurality).

As used herein, the term "controller" shall mean a programmable analog and/or digital device (including an associated memory part or portion) that can store, retrieve, execute and process data (e.g., software routines and/or information used by such routines), including, without limitation, a field programmable gate array (FPGA), a complex programmable logic device (CPLD), a programmable system on a chip (PSOC), an application specific integrated circuit (ASIC), a microprocessor, a microcontroller, a programmable logic controller, or any other suitable processing device or apparatus. The memory portion can be any one or more of a variety of types of internal and/or external storage media such as, without limitation, RAM, ROM, EPROM(s), EEPROM(s), FLASH, and the like that provide a storage register, i.e., a non-transitory machine-readable medium, for data and program code storage such as in the fashion of an internal storage area of a computer, and can be a volatile memory or nonvolatile memory.

As used herein, the term "rope" shall mean an elongated cord of strands of fibers or wire (e.g., metal) twisted or braided together.

Directional phrases used herein, such as, for example, and without limitation, top, bottom, left, right, upper, lower, front, back, and derivatives thereof, relate to the orientation of the elements shown in the drawings and are not limiting upon the claims unless expressly recited therein.

The disclosed concept will now be described, for purposes of explanation, in connection with numerous specific details in order to provide a thorough understanding of the disclosed concept. It will be evident, however, that the disclosed concept can be practiced without these specific details without departing from the spirit and scope of this innovation.

As described herein in detail, the disclosed concept provides a modular system that can be assembled and secured on a variety of staircases with minimal effort. Compared to prior art devices, the system of the disclosed concept is unobtrusive and allows users to navigate the stairs in an upright walking position with their hand placed where a handrail typically and intuitively is located. Unlike other devices, the system of the disclosed concept actively leads users on the stairs and allows them to navigate an otherwise difficult home feature with ease.

Figure 2:
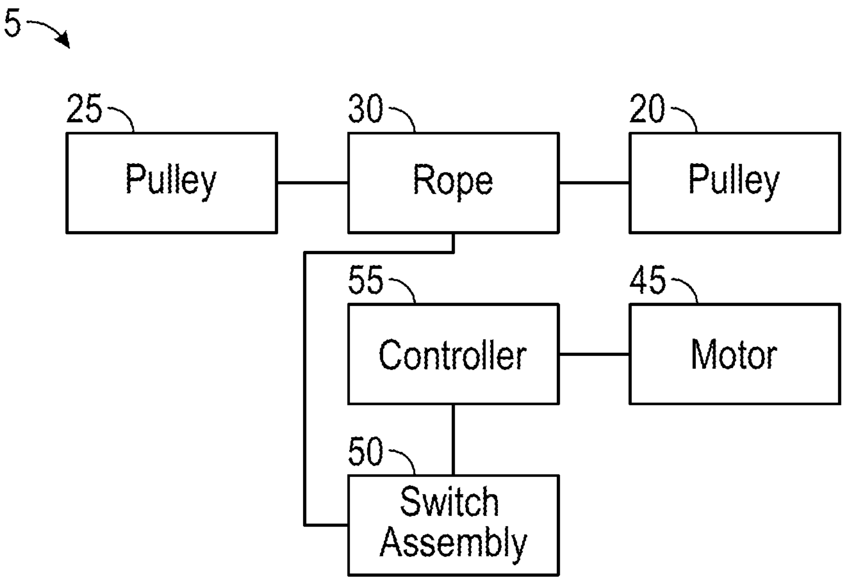
FIG. 2 is a block diagram of the stair navigation assist of FIG. 1.
Figure 3:
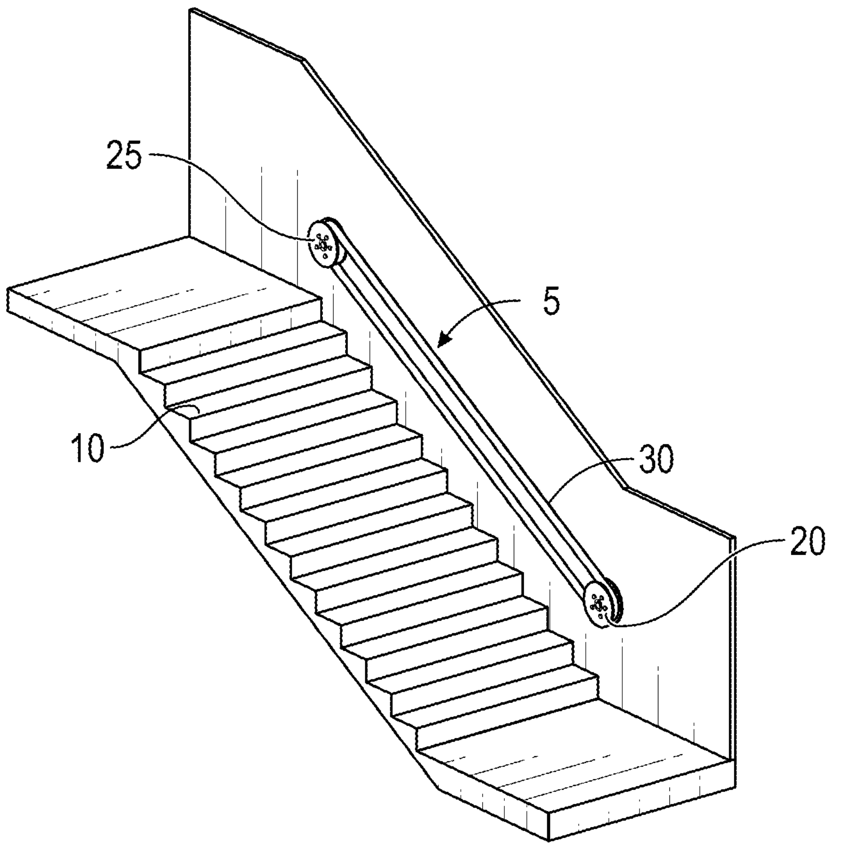
FIG. 3 is a schematic diagram of the stair navigation assist of FIG. 1 with certain components removed for illustration purposes.

FIG. 1 is a schematic diagram and FIG. 2 is a block diagram of a stair navigation assist system 5 according to an exemplary embodiment of the disclosed concept. FIG. 3 is a schematic diagram of system 5 with certain components (discussed below) removed for illustration purposes. As described in detail herein, system 5 is structured and configured to actively and automatically assist a user 10 while navigating a set of stairs 15.

As seen in FIGS. 1-3, system 5 includes a motor driven rope and pulley assembly that includes a first pulley 20, a second pulley 25 and a rope 30 (or, alternatively, some other elongated member such as, without limitation, an engineered cord, a unitary belt or foam beads or a foam extrusion wrapped in a durable woven outer cover) engaged with and looped around first pulley 20 and second pulley 25. In FIG. 1, first pulley 20 is shown covered by a protective shroud 35 and second pulley 25 is shown covered by a protective shroud 35. In FIG. 3, shrouds 35 and 40 have been removed to show pulleys 20 and 25 more clearly.

Referring to FIG. 2, system 5 further includes an electric motor 45, a switch assembly 50, and a controller 55 that is coupled to both motor 45 and switch assembly 50. As seen in FIG. 2, motor 45 is directly coupled to at least first pulley 20 for driving first pulley 20 under control of controller 55. Thus, in this configuration, first pulley 20 is a driven pulley and second pulley 25 is an idler pulley. It will be understood that this may be reversed, such that first pulley 20 is the idler pulley and the second pulley 25 is the driven pulley. In addition, switch assembly 50 is operatively coupled to rope 30 for sensing when a user 10 applies at least a certain amount of force to rope 30. As described in more detail herein in connection with a particular embodiment of switch assembly 50, switch assembly 50 operates as an activation/deactivation mechanism for, under control of controller 55, switching motor 45 on and off so as to activate/deactivate the pulley system and thus system 5.

Figure 4:
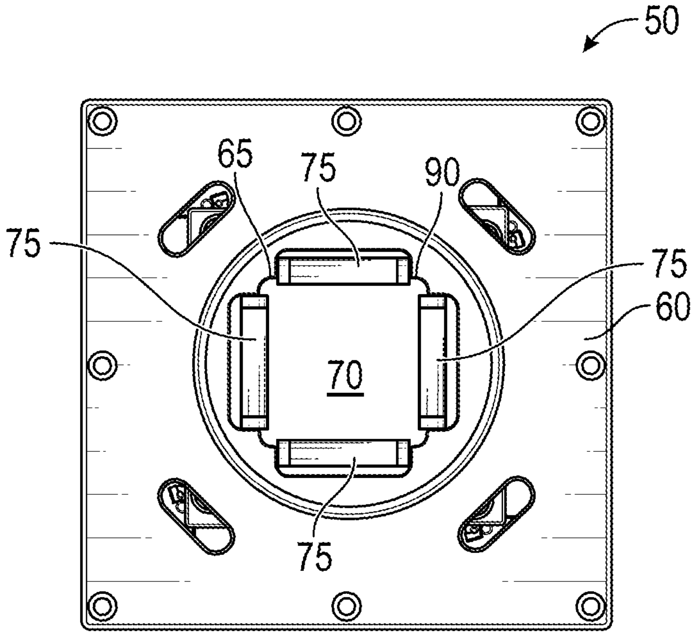
FIG. 4 is a front elevational view.
Figure 5:
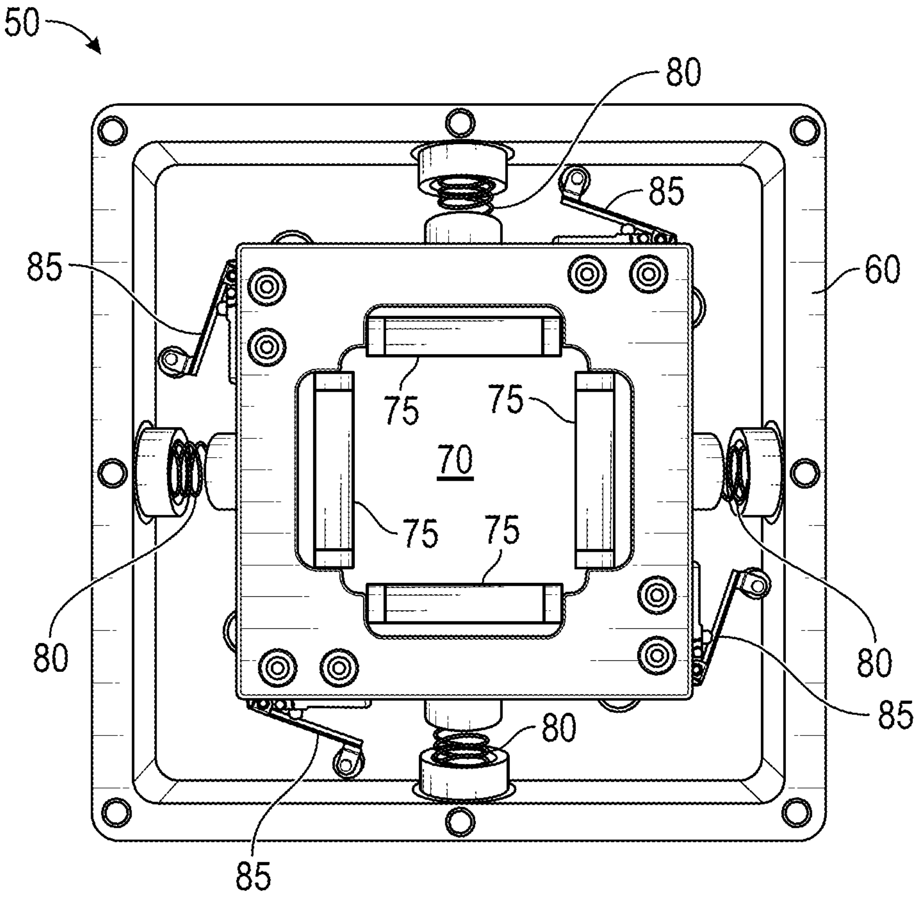
FIG. 5 is a rear elevational view of a switch assembly of the system of FIG. 1 according to one non-limiting exemplary embodiment of the disclosed concept.

FIG. 4 is a front elevational view, and FIG. 5 is a rear elevational view of switch assembly 50 according to one non-limiting exemplary embodiment of the disclosed concept. As seen in FIGS. 4 and 5, switch assembly 50 includes a housing 60 that houses a switch device 65. Switch device 65 is shown without hosing 60 in FIG. 6. Referring to FIG. 7, which is a schematic diagram of a portion of system 5 showing first pulley 20 and shroud 35 with a cover thereof removed, switch assembly 50 is structured and configured to be received and held within shroud 35 at a front top portion of shroud 35. In addition, as seen most readily in FIGS. 5 and 6, switch assembly 65 includes an aperture 70 in the center thereof. Aperture 70 is positioned so as to enable the insertion of rope 30 through aperture 70 as seen in FIG. 7 while it is wound around first pulley 20.

Figure 6:
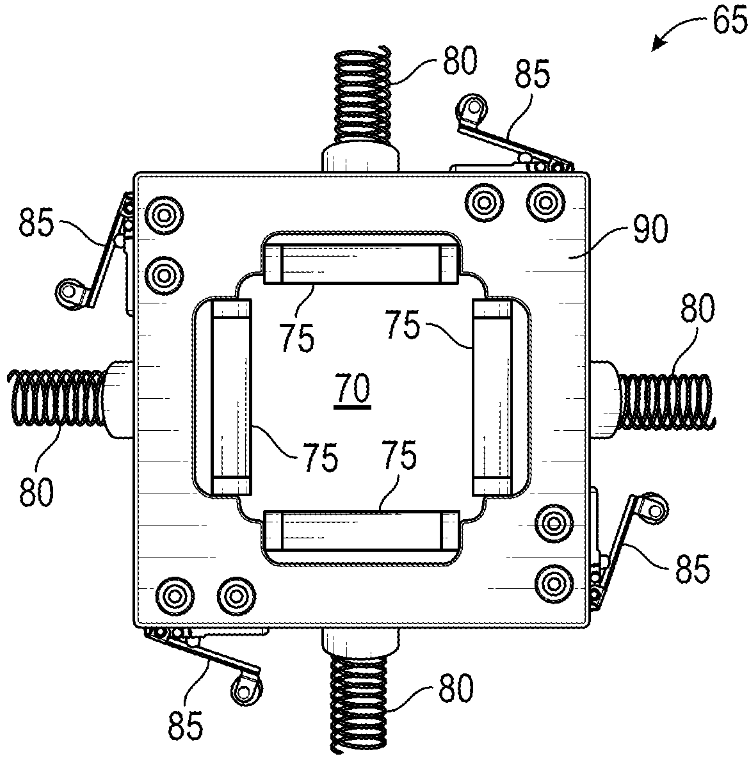
FIG. 6 is a rear elevational view of the switch assembly of FIGS. 4 and 5 with the housing thereof removed.
Figure 7:
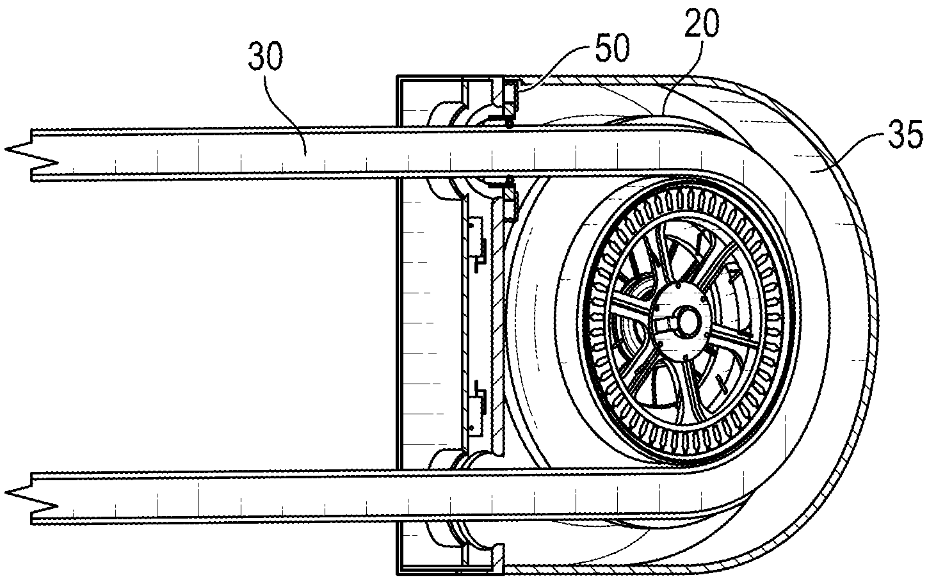
FIG. 7 is a schematic diagram of a portion of the system of FIG. 1 showing a first pulley and a shroud with a cover thereof removed.

Referring to FIGS. 5 and 6, switch device 65 further includes four rollers positioned around aperture 70 on the inside of a frame member 90 of switch device 65. Each roller 75 is associated with a spring 80 of switch device 65 (thus four springs 80 are provided). More particularly, each spring 80 is held and positioned in between a respective portion of frame member 90 and a respective portion of housing 60 as shown in FIG. 5. In addition, each roller 75 is further associated with an electrical switch 85 held and positioned in between a respective portion of frame member 90 and a respective portion of housing 60 as shown in FIG. 5 (thus four springs 80 are provided). Each switch 85 is normally open and is closed only when sufficient force is applied to the associated roller 75 by rope 30.

As noted above, rope 30 travels through the center of the switch device 65 in aperture 70, and when rope 30 is displaced up/down/sideways due to a user 10 applying a force to rope 30, rope 30 contacts one or more of the rollers 75 and triggers one or more of the four limit switches 85. The triggered limit switch or switches 85 then triggers the motor 45 to power/turn on. This feature thus provides a degree of intuitive control of system 5 so that a user 10 does not have to flip a switch to turn system 5 on. Rather, system 5 is structured and configured to automatically turn on when the user 10 needs it. It should be noted that this configuration, with the mechanical switch device 65 as just described, is meant to be exemplary only, and that other, alternative automatic activation/deactivation mechanisms are also contemplated within the scope of the disclosed concept. Such alternatives may include, for example, and without limitation, more sophisticated automatic activation/deactivation mechanisms, such as non-contact switching (e.g., ultrasound or infrared switching) when the hand of a user 10 is close to rope 30 or when rope 30 displaces, "stretch-sensors" in rope 30 itself, or force sensors measuring force on the driven or idler pulley 20, 25.

In operation, system 5 is in a normally off condition where rope 30 is stationary and not moving along pulleys 20, 25.

Then, when a user 10 approaches stairs 15 and grabs and applies a force to rope 30, motor 45 will be triggered as just described through the operation of the switch device 65. As a result, first pulley 20 will be driven by motor 45 and rope 30 will be caused to move around driven pulley 20 and idler pulley 25 in a loop. Movement of rope 30 in this manner, when held by the hand of user 10, will assist user 10 is navigating stairs 15. When user 10 finishes navigating stairs 15 and lets go of rope 30, the previously closed switch or switches 85 will be opened, and motor 45 will be turned off so as to deactivate system 5.

Figure 8:
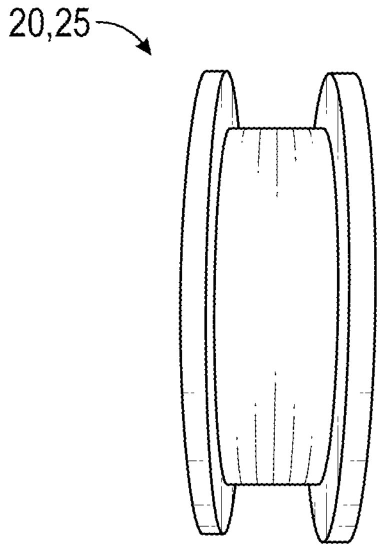
FIG. 8 is front view of a flat pulley of the system of FIG. 1 according to one embodiment.
Figure 9:
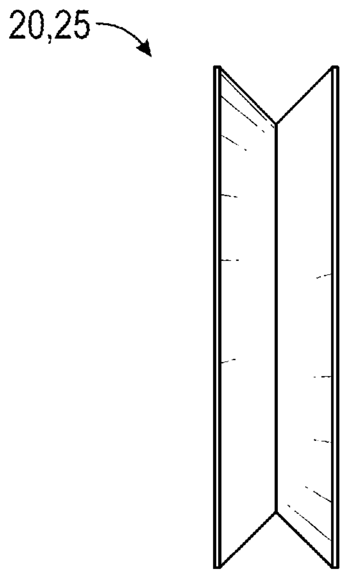
FIG. 9 is front view of a V-shaped pulley of the system of FIG. 1 according to another embodiment.

In addition, the pulleys 20, 25 may, in some embodiments, be structured so as to "throttle" how much support is provided to the user. The idea is that, depending on the construction and materials of pulleys 20, 25, rope 30 can slide over the driven first pulley 20 such that rope 30 may be moving slower than driven first pulley 20. In this manner, first pulley 20 acts as a friction-based clutch. As the user 10 pushes on rope 30, it increases the tension, and therefore the friction between rope 30 and first pulley 20, and rope 30 moves at the surface speed of first pulley 20. The user 10 thus acts as a "tensioner" for rope 30 to throttle how fast and forceful it is pulling a user 10 up the stairs 15. The opposite situation occurs when a user 10 is going down the stairs 15. First pulley 20 is still attempting to move the top of rope 30 "up" stairs 15, and when the user 10 pushes down on it (now descending the stairs 15), rope 30 acts as a brake, helping to stabilize the user 10 from going too fast down the stairs 15. The gist is that rope 30 slides over pulley 20, 25, and as more tension is applied to rope 30 (because the user 10 pushes on it), there is a higher reaction force between pulley 20, 25 and rope 30, which increases the friction, and therefore the amount of pull force on rope 30 as someone is navigating stairs 15. In one particular embodiment, at least the surface of pulley 20, 25 is made of low friction material, such as, without limitation, Nylon (coefficient of friction 0.15-0.25), Teflon (coefficient of friction 0.05-0.20), or Wood (coefficient of friction 0.25-0.50), to allow rope 30 to slide over pulley 20, 25 as just described. In one embodiment, the low friction material has a coefficient of friction of 0.05-0.50. In addition, it should be noted that the profile of pulley 20, 25 becomes important when trying to implement this friction-based clutch. A flat pulley embodiment, as shown in FIG. 8 may be used. However, such an embodiment may not be as effective as, for example, V-shaped pulley embodiment shown in FIG. 9. In that embodiment, as a tensioning force is applied, rope 30 wedges further down in the "V" and rapidly increases the friction between the pulley 20, 25 and rope 30.

Alternatively, as opposed to the friction based clutch mechanism just described, other clutch mechanism may also be employed. For example, a more traditional clutch mechanism may be used. As a further alternative, a smart controller embodiment may be employed which senses the tension on rope 30 (e.g., through a sensor either woven into or otherwise coupled to rope 30, or attached to either the driven first pulley 20 or idler second pulley 25). This configuration would enable modulation of the speed and force of rope 30 traveling up and down stairs 15. In such a configuration, the speed is just the rate of rope 30 travelling the stairs 15, and the force is the maximum force that can be transmitted to the user 10 (over which would result in the rope remaining still so as to not "tug" or suddenly pull someone too hard up the stairs).

Figure 10:
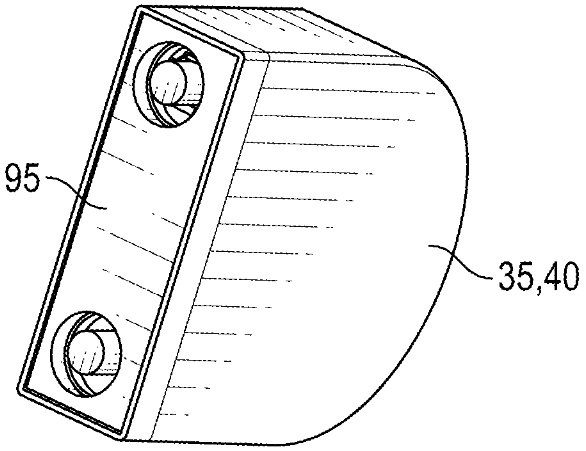
FIGS. 10 and 11 are isometric views of a safety stop assembly of the system of FIG. 1 according to one embodiment.
Figure 11:
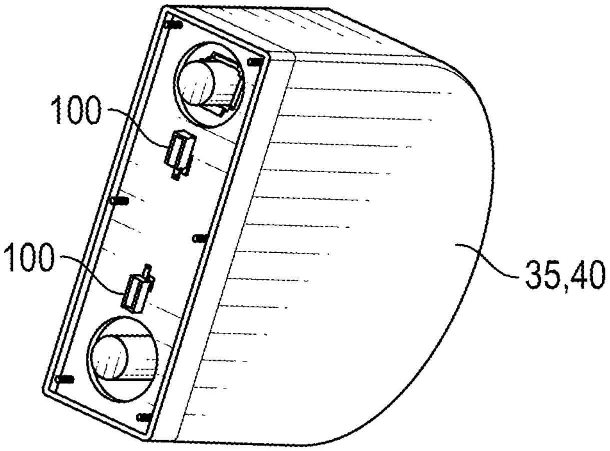

As discussed above, the automatic activation system serves also as an automatic stop. This is because when a user 10 releases rope 30, system 5 turns off. In a further embodiment, however, system 5 also includes a safety stop that has been designed to address the circumstance where someone continues to push on the rope (i.e. keeping the activation going) as their hand reaches either the driven pulley 20 or idler pulley 25. In this additional embodiment, as seen in FIGS. 10 and 11, a contact plate 95 and set of limit switches 100 (coupled to controller 55) are designed into shroud 35, 40. In operation, if the hand of the user 10 impacts contact plate 95, limit switches 100 are closed, which send a signal to controller 55 for shutting the power off to system 5.

Figure 12:
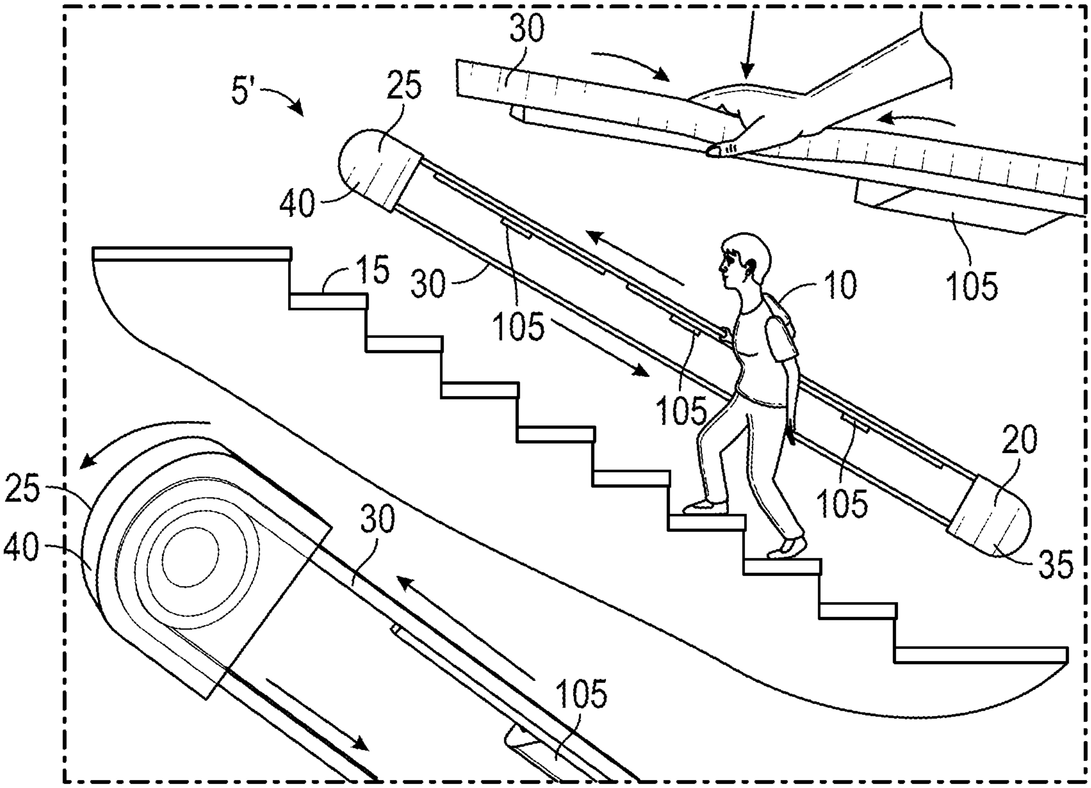
FIG. 12 is a schematic diagram of a stair navigation assist system according to an alternative exemplary embodiment of the disclosed concept.

FIG. 12 is a schematic diagram of a stair navigation assist system 5' according to an alternative exemplary embodiment of the disclosed concept. Stair navigation assist system 5' is similar to stair navigation assist system 5, and like parts are labelled with like reference numerals. In this embodiment, rope 30 travels on or through a number of wall-mounted track support members 105 (like a conveyor) to increase its lateral stability between the pulleys 20, 25. This is especially important for long stairways where a user would be holding on and mid-span the rope could be easily displaced by 4+ inches or more.

Finally, while the exemplary embodiments described above include only two pulleys, it will be understood that that is meant to be exemplary only. In other embodiments, the system could include more than just two pulleys, going up multiple flights of stairs as the rope or other elongated member goes around corners on additional idler or driven pulleys.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system for assisting a user with navigating a set of stairs, comprising:

a pulley system positioned adjacent to the stairs, the pulley system including a first pulley, a second pulley, and an elongated member coupled to and looped around the first pulley and the second pulley;

a motor coupled to the first pulley;

a sensing assembly operatively coupled to the pulley system, the sensing assembly being structured and configured to sense that a force is being applied to or that is about to be applied to the elongated member by the user; and a controller coupled to the motor and the sensing assembly, wherein the controller is structured and configured to, responsive to the sensing assembly sensing the force, turn the motor on to drive the first pulley, wherein the sensing assembly comprises a switch assembly having a number of switches coupled to the pulley system, the switch assembly being structured and configured to sense that the force is being applied to the elongated member by the user, wherein the switch assembly is positioned adjacent to the first pulley, wherein the elongated member is received through an aperture provided in the switch assembly, and wherein one or more of the number of switches of the switch assembly are structured and configured to be closed in response to the force being applied to the elongated member by the user, wherein the first pulley and the switch assembly are housed within a first shroud member, and wherein the second pulley is housed within a second shroud member, wherein the first and second shroud members are coupled to the controller, wherein the first shroud member is structured and configured to sense that the user is touching the first shroud member and responsive thereto the controller is structured and configured to turn the motor off, and wherein the second shroud member is structured and configured to sense that the user is touching the second shroud member and responsive thereto the controller is structured and configured to turn the motor off.

2. The system according to claim 1, wherein the switch assembly includes a frame member surrounded by a housing, wherein the aperture is formed in the frame member, and wherein each of the number of switches is positioned in between the frame member and the housing.

3. The system according to claim 2, further comprising a plurality of springs positioned in between the frame member and the housing.

4. The system according to claim 3, further comprising a plurality of roller members positioned around a perimeter of the aperture.

5. The system according to claim 4, wherein the number of switches comprises at least four switches, wherein the plurality of springs comprises four springs and the plurality of rollers comprises four rollers.

6. The system according to claim 1, wherein the first shroud member includes a first plate member and a first switch coupled to the first plate member, wherein the first switch is structured and configured to close responsive to the user touching the first shroud member, the controller being structured and configured to determine that the first switch is closed and responsive thereto turn the motor off, and wherein the second shroud member includes a second plate member and a second switch coupled to the second plate member, wherein the second switch is structured and configured to close responsive to the user touching the second shroud member, the controller being structured and configured to determine that the second switch is closed and responsive thereto turn the motor off.

7. A system for assisting a user with navigating a set of stairs, comprising:

a pulley system positioned adjacent to the stairs, the pulley system including a first pulley, a second pulley, and an elongated member coupled to and looped around the first pulley and the second pulley;

a motor coupled to the first pulley;

a sensing assembly operatively coupled to the pulley system, the sensing assembly being structured and configured to sense that a force is being applied to or that is about to be applied to the elongated member by the user; and a controller coupled to the motor and the sensing assembly, wherein the controller is structured and configured to, responsive to the sensing assembly sensing the force, turn the motor on to drive the first pulley, wherein the first pulley is housed within a first shroud member coupled to the controller and the second pulley is housed within a second shroud member coupled to the controller, wherein the first shroud member is structured and configured to sense that the user is touching the first shroud member and responsive thereto the controller is structured and configured to turn the motor off, and wherein the second shroud member is structured and configured to sense that the user is touching the second shroud member and responsive thereto the controller is structured and configured to turn the motor off.

8. The system according to claim 7, wherein the first shroud member includes a first plate member and a first switch coupled to the first plate member, wherein the first switch is structured and configured to close responsive to the user touching the first shroud member, the controller being structured and configured to determine that the first switch is closed and responsive thereto turn the motor off, and wherein the second shroud member includes a second plate member and a second switch coupled to the second plate member, wherein the second switch is structured and configured to close responsive to the user touching the second shroud member, the controller being structured and configured to determine that the second switch is closed and responsive thereto turn the motor off.

9. The system according to claim 7, wherein the elongated member comprises a rope or a belt.

10. The system according to claim 7, wherein the first pulley has a V-shaped cross-section.

11. The system according to claim 7, wherein the first pulley is made of a low friction material that has a coefficient of friction of 0.05-0.50.

12. The system according to claim 7, wherein the sensing assembly comprises a switch assembly having a number of non-contact switches coupled to the pulley system, the switch assembly being structured and configured to sense that the force is about to be applied to the elongated member by the user.

13. The system according to claim 7, wherein the elongated member comprises a number of sensors for sensing tension in the elongated member, the number of sensors of the elongated member forming part of the sensing assembly.

14. The system according to claim 7, the sensing assembly comprising a number of force sensors structured and configured for measuring a force on the first pulley and/or the second pulley.

15. The system according to claim 7, further comprising a number of track support members, wherein the elongated member travels on or through the number of track support members.

16. A method for assisting a user with navigating a set of stairs, comprising:

providing a pulley system positioned adjacent to the stairs, the pulley system including a first pulley, a second pulley, and an elongated member coupled to and looped around the first pulley and the second pulley, wherein the first pulley is housed within a first shroud member, and the second pulley is housed within a second shroud member, the method further sensing that the user is touching the first shroud member or the second shroud member and responsive thereto turning the motor off;

sensing that a force is being applied to or that is about to be applied to the elongated member by the user; and responsive to sensing the force, turning the motor on to drive the first pulley.

17. The method according to claim 16, wherein the elongated member travels on or through a number of track support members.

18. The method according to claim 16, wherein the first pulley acts as a friction-based clutch such that the elongated member slides over the first pulley and as more tension is applied to the elongated member by the user there is a higher reaction force between the first pulley and the elongated member.

* * * * *